June 19, 1962  F. G. BUHRENDORF  3,040,223
OSCILLATORY DRIVE CIRCUIT
Filed June 24, 1959

INVENTOR
F. G. BUHRENDORF
BY
Kenneth B Hamlin

ATTORNEY

United States Patent Office 3,040,223
Patented June 19, 1962

3,040,223
OSCILLATORY DRIVE CIRCUIT
Frederick G. Buhrendorf, Westfield, N.J., assignor to Bell Telephone Laboratories, Incorporated, New York, N.Y., a corporation of New York
Filed June 24, 1959, Ser. No. 822,486
4 Claims. (Cl. 318—124)

This invention relates to motor control systems and more particularly to electric motor control systems by which the motion of an object is controlled in an oscillatory manner.

Motor control systems are contemplated in this invention which convert electrical inputs into equivalent physical motion in the form of oscillatory movement. Such a motor control system is particularly suited to applications in drive control circuits for devices or systems requiring drive to oscillate equipment back and forth over a predetermined range which may be varied within certain limits. Moreover, this invention may be advantageously employed to produce continuous reciprocation of an element between variably spaced positions.

Know oscillatory motor drive arrangements employ reversing switches in the armature circuit of the motor, or circuitry for controlling the phase of the alternating current applied to one or more field windings, to control the direction of rotation of the motor, thereby effecting oscillatory drive. Other known oscillatory drive arrangements employ gears and mechanical devices to effect oscillatory or reciprocating drive. The known arrangements are complex, difficult to synchronize to a desired frequency, and are susceptible to mechanical and/or electrical failure. Furthermore, the known arrangements provide no simple or convenient means of varying the size or angle of the sector through which oscillation occurs.

Accordingly, it is an object of this invention to provide an electric motor control system for converting electrical inputs into predetermined oscillatory motion.

Another object of the invention is to provide a motor control system whereby the amplitude of oscillation of an object can be simply and conveniently controlled.

These and other objects are attained in an illustrative embodiment of the present invention through the use of a motor having a rotor and two stator windings and control circuitry for applying particular input signals to the stator windings to effect oscillatory motion of the rotor thereof. Direct current is applied to one winding of the motor causing the rotor to resist motion in either direction. Alternating current is applied to another winding of the motor, producing a magnetic field which oscillates through an angle which is a function of the field produced by the alternating current. The rotor tends to follow the magnetic field thus produced and oscillates through a predetermined angle. The rotor is fixed to a rigid shaft which in turn is clamped to the utilization device thus driving the utilization device in an oscillatory manner. The mechanical system including the rotor, shaft and utilization device is advantageously made to resonate at the same frequency as the applied alternating current, thus the oscillatory motion of the motor will essentially follow the oscillating field. Feedback circuitry provides frequency synchronization between the oscillatory motion of the rotor and the frequency of the applied alternating current.

Accordingly, it is a feature of my invention that a motor control system for providing oscillatory drive include an electric motor having at least two windings and a rotor, a source of direct current, a source of alternating current, circuitry for applying currents from the two sources to respective windings of the motor, and feedback circuitry for controlling the frequency of the alternating current in accordance with the frequency of the oscillatory motion of the rotor.

It is also a feature that the amplitude of the oscillatory drive provided by the motor control system in accordance with my invention be readily controllable by selectively changing the ratio of the magnitude of the alternating current and direct current applied to the respective field windings of the drive motor.

These and other objects and features of this invention will be better understood upon consideration of the following detailed description and the accompanying drawing, in which.

Figure 1:
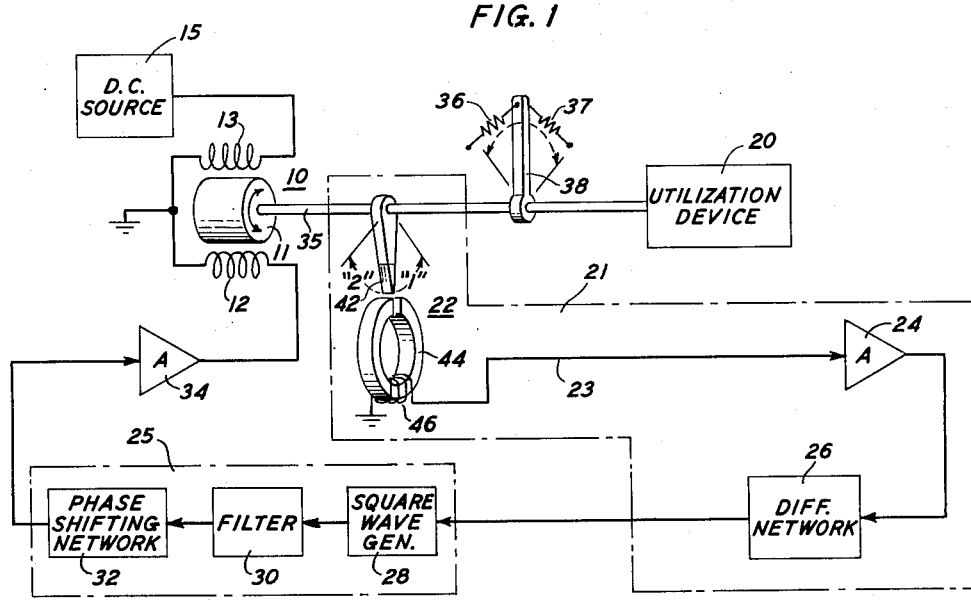
FIG. 1 is a block diagram of an illustrative embodiment in accordance with the principles of my invention.

Referring more particularly to the drawing, FIG. 1 shows an illustrative embodiment of an oscillatory drive motor control system in accordance with the principles of this invention comprising motor 10, direct-current source 15, alternating-current source 25 and feedback circuit 21. Advantageously, motor 10 is a substantially conventional hysteresis synchronous motor having rotor 11 and stator windings 12 and 13, disposed ninety electrical degrees apart. Direct-current source 15 is connected to winding 13, and alternating-current source 25 is connected through control amplifier 34 to winding 12 for supplying the respective currents thereto. The amplification provided by control amplifier 34 is readily variable to control the peak magnitude of the alternating current applied to winding 12.

Rotor 11 is coupled to shaft 35 which is also coupled to utilization device 20. The manner of mechanically coupling rotor 11 to utilization device 20 depends upon whether an oscillating or reciprocating motion is desired in the particular utilization device used. For example, oscillatory motion of rotor 11 can be coupled directly to utilization device 20 to provide oscillation thereof through a particular angle as shown in FIG. 1, or rotor 11 can be coupled through any offset or crank arm arrangement known in the art to produce reciprocation of utilization device 20 between predetermined positions. The oscillating motion of rotor 11 is coupled through feedback circuit 21 to a control input of source 25 to provide frequency synchronization between the motion of utilization device 20 and the frequency of the alternating current from source 25, as will be explained hereinafter.

A clamping torque is produced by the application of direct current from source 15 to winding 13 which resists motion of rotor 11 in either direction. This can be considered the rest position of rotor 11 and defines a point about which rotor 11 is caused to move in an oscillatory manner. Similarly, of course, the torque produced resists movement of utilization device 20 in either direction and defines a rest position thereof. Concurrently with the application of direct current to winding 13, alternating current is applied to winding 12 by source 25, producing an oscillatory magnetic field in motor 10.

Figure 3:
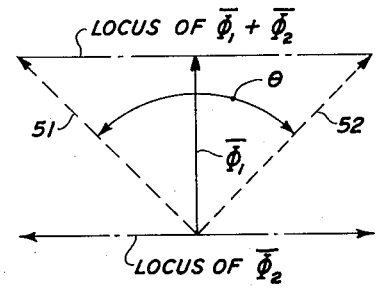
FIG. 3 is a vector diagram showing the oscillating field produced in the motor in the circuit of FIG. 1.

This oscillating magnetic field is illustrated in FIG. 3, where the field produced by the alternating current applied to winding 12 is represented as the locus of $\overline{\Phi_2}$, and where $\overline{\Phi_1}$ represents the component of the magnetic field produced by the direct current applied to winding 13. The resultant magnetic field oscillates between limits 51 and 52, which are determined by the ratio of the peak magnitude of the alternating current to the magnitude of the direct current. Thus, the angle $\theta$ through which the magnetic field oscillates is defined by the relationship:

$$\theta = 2 \arctan \frac{I_{ac}}{I_{dc}}$$

where $\theta$ is the angle in electrical degrees, $I_{ac}$ is the peak magnitude of the alternating current in winding 12 and $I_{dc}$ is the magnitude of the direct current in winding 13. For purposes of illustration, the magnitude of the alternating current is considered as being equal to the magnitude of the direct current in the exemplary illustration in FIG. 3, and thus angle $\theta$ is equal to ninety electrical degrees. Of course, angle $\theta$ may be varied directly through variation of the magnitude of the alternating current applied to winding 12, or inversely through variation of the magnitude of the direct current applied to winding 13, to a maximum angle approaching one hundred and eighty electrical degrees.

Rotor 11 of motor 10 in FIG. 1 tends to follow the oscillating magnetic field and oscillates through a proportional angle at the same frequency. The mechanical angle through which rotor 11 oscillates is, of course, inversely proportional to the number of poles per phase in motor 10. Maximum amplitude of oscillation, for a given ratio of current magnitudes applied to motor 10, is attained by tuning rotor 11 and utilization device 20 to a resonant frequency equal to the desired frequency of oscillation. This may advantageously be achieved in a manner known in the art by arm 38 and springs 36 and 37. Arm 38 is fixedly secured to shaft 35 in any suitable manner to swing back and forth in response to the oscillations of shaft 35. One end of springs 36 and 37 is attached to arm 38 as shown, with the other end of each of the springs attached to a fixed support not shown. When shaft 35 rotates in one direction, spring 36 is tensioned and spring 37 is compressed. When shaft 35 rotates in the opposite direction, spring 36 is compressed and spring 37 is tensioned. By selecting springs 36 and 37 with suitable spring constants, rotor 11 and utilization device 20 are made to resonate at a frequency slightly greater than the desired oscillatory frequency. The desired resonant frequency can then be attained readily by adding mass to rotor 11 and device 20 in the manner known in the art. Rotor 11 and utilization device 20 may also advantageously be resonated at a desired frequency of oscillation by utilizing torsion springs or torsion bars in a manner also well known in the art. Once the desired oscillatory frequency has been selected, the amplitude of oscillation is simply and conveniently controlled at all times by control amplifier 34.

If the frequency of the alternating current applied to winding 12 differs from the resonant frequency to which rotor 11 and utilization device 20 are tuned, the amplitude of oscillation of rotor 11 will be substantially reduced. Accordingly, feedback circuit 21 advantageously synchronizes the frequency of the alternating current applied by source 25 to winding 12 to the frequency of the natural oscillatory period of rotor 11. Feedback circuit 21 may be coupled between any portion of the oscillating or reciprocating mechanical system and the control input to source of alternating current 25. Advantageously, feedback circuit 21 is insensitive to variations in the amplitude of oscillation and is capable of sensing the direction of motion of the mechanical system. As will be described, source 25 responds to control pulses from feedback circuit 21 and varies the frequency of the alternating current applied to winding 12 to correspond to the frequency of oscillation or reciprocation of rotor 11 and utilization device 20.

Considering the operation of the circuit of FIG. 1, direct current is applied to winding 13 from source 15 and alternating current is applied to winding 12 from source 25 to produce an oscillating magnetic field in the manner described above. As mentioned before, alternating-current source 25 is responsive to control pulse inputs to control the frequency of the alternating current applied to winding 12. The square wave voltage generated by square wave generator 28 is applied to filter 30 where it is converted into a substantially sinusoidal voltage. This sinusoidal voltage is applied to phase shifting network 32 where compensation for the phase shift introduced by feedback circuit 21 and control amplifier 34 is attained. Initially the frequency of the square wave generator 28 is selected to be slightly less than the desired frequency of oscillation to which rotor 11 and utilization device 20 are tuned. Thus, upon initial energization, generator 28, through low-pass filter 30, provides an alternating current to winding 12 which produces an oscillating magnetic field in motor 10 of a frequency slightly less than the resonant frequency to which rotor 11 is tuned. Rotor 11 begins to oscillate, following the magnetic field, and drives utilization device 20. Feedback circuit 21 produces electrical control pulses as will be described in accordance with the frequency and direction of oscillation of rotor 11. These control pulses quickly synchronize generator 28 to operate at the frequency at which rotor 11 and device 20 are oscillating.

Figure 2:
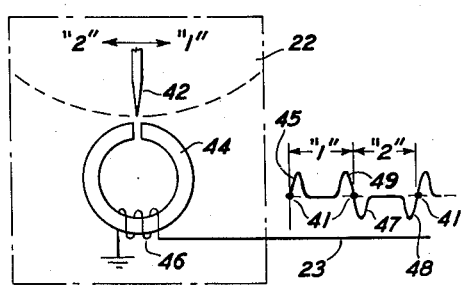
FIG. 2 is an enlarged view of the transducer forming a part of the feedback circuit shown in FIG. 1 with an illustrative voltage waveform produced thereby.

An illustrative feedback circuit 21 which controls the synchronization of the frequency of square wave generator 28 to the oscillatory frequency of rotor 11 is shown in FIG. 1 and comprises transducer 22, amplifier 24, and differentiating network 26. As shown in FIGS. 1 and 2, transducer 22 comprises arm 42 fixedly secured to shaft 35, magnetic core 44, and coil 46 connected to lead 23. The end of arm 42 adjacent core 44 is permanently magnetized and will induce a flux in core 44 as it swings past the air gap thereof. When rotor 11 and utilization device 20 are in the rest position defined above, the magnetized end of arm 42 is positioned adjacent to the air gap of magnetic core 44 and equidistant from the ends of core 44 as shown in FIG. 2. Movement of arm 42 from the rest position, in the plane of core 44 and toward one or the other of the ends of core 44, changes the flux linkage through coil 46 and produces a corresponding pulse on conductor 23.

An exemplary waveform is shown in FIG. 2 for the output on conductor 23 produced by the oscillating or reciprocating motion of arm 42. As arm 42 moves to the right away from the rest position in direction "1," flux is induced in core 44 which links coil 46 and causes a positive voltage pulse 45 to be applied to conductor 23. As arm 42 moves back to the rest position, another positive pulse 49 is applied to conductor 23. As arm 42 proceeds past the rest position to the left in direction "2," a negative voltage pulse 47 is applied to conductor 23, and another negative pulse 48 is applied to conductor 23 as arm 42 moves back to the rest position. Points 41 on the waveform in FIG. 2 indicate the location of arm 42 in the rest position, and the direction of change in polarity at this point indicates the direction of motion. Therefore, the output on conductor 23 is indicative of the frequency and direction of motion of rotor 11 and utilization device 20.

The output signal on conductor 23 is amplified by amplifier 24 and differentiated by network 26 to produce a pulse at each point in time 41 that the signal on conductor 23 changes polarity. The polarity of the pulses produced at the output of network 26 will be determined by whether the signal on conductor 23 is positive-going or negative-going when it changes polarity. These control pulses are applied to square wave generator 28, as mentioned hereinabove, to control the frequency thereof. In this manner the frequency of the alternating current applied to winding 12, and hence the frequency of the oscillating field which rotor 11 follows, is advantageously controlled to correspond to the oscillatory frequency to which rotor 11 and utilization device 20 are tuned. It will be noted that feedback circuit 21 is free from amplitude sensitivity since it merely acts as an axis-crossing detector in producing a pulse each time the system moves past its rest position, the polarity being determined by the direction in which it moves past.

It is understood that the above-described arrangements are merely illustrative of the application of the principles of the invention. Numerous other arrangements may be devised by those skilled in the art without departing from the spirit and scope of the invention.

What is claimed is:

1. In an oscillatory drive circuit, the combination comprising a motor having a rotor and two field windings, said field windings being disposed ninety electrical degrees apart, a source of direct current, a source of alternating current, means for connecting said source of direct current to one of said windings, means for connecting said source of alternating current to the other of said windings, means for varying the magnitude of said alternating current applied to said other of said windings, means for controlling the frequency of said alternating current, and means for resonating said rotor to oscillate at a predetermined frequency.

2. In an oscillatory drive circuit, the combination comprising a motor having a rotor and first and second field windings, said first and second field windings being disposed ninety electrical degrees apart, a source of direct current, a source of alternating current, means for connecting said source of direct current to said first winding, means for connecting said source of alternating current to said second winding, means for selectively changing the ratio of the magnitude of said direct current and said alternating current applied to said first winding and said second winding respectively, and feedback means for controlling the frequency of said alternating current in accordance with the motion of said rotor.

3. In a circuit for providing oscillatory drive through a variable angle and at a predetermined frequency, the combination comprising a motor having two field windings disposed ninety electrical degrees apart and a rotor, means for resonating said rotor to oscillate at said predetermined frequency, means for applying direct current to one of said field windings, means for applying alternating current to the other of said field windings, said alternating current being of a frequency substantially the same as said predetermined frequency, means for controlling the magnitude of said alternating current, means coupled to said rotor for deriving control pulses in accordance with the frequency of oscillation of said rotor, and means responsive to said control pulses for controlling the frequency of said alternating current.

4. In an oscillatory drive circuit, the combination comprising a motor having at least two field windings disposed ninety electrical degrees apart and having a rotor of magnetic material, means for establishing an oscillating magnetic field in said motor including means for applying alternating current to one of said field windings and means for applying direct current to another of said field windings, means for controlling the frequency of said alternating current, and means for controlling the ratio of the magnitude $I_{ac}$ of said alternating current and the magnitude $I_{dc}$ of said direct current, whereby said rotor is caused to oscillate at substantially the frequency of said alternating current through an electrical angle $\theta$ in accordance with the relationship, $$\theta = 2 \arctan \frac{I_{ac}}{I_{dc}}$$

References Cited in the file of this patent

UNITED STATES PATENTS

| 2,297,084 | Swallow | Sept. 29, 1942 |
| 2,361,396 | Gross | Oct. 21, 1944 |
| 2,960,643 | Boyd | Nov. 15, 1960 |

FOREIGN PATENTS

| 650,052 | Great Britain | Feb. 14, 1951 |